US008595496B2

(12) United States Patent
Kim et al.

(10) Patent No.: US 8,595,496 B2
(45) Date of Patent: Nov. 26, 2013

(54) METHOD AND SYSTEM FOR UPDATING TIME INFORMATION OF A DRM DEVICE

(75) Inventors: Hee Jean Kim, Gyeonggi-do (KR); Maeng Hee Sung, Seoul (KR); Weon Il Jin, Gyeonggi-do (KR); Bae Eun Jung, Gyeonggi-do (KR); Tae-Chul Jung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1186 days.

(21) Appl. No.: 11/898,471

(22) Filed: Sep. 12, 2007

(65) Prior Publication Data

US 2008/0195869 A1 Aug. 14, 2008

(30) Foreign Application Priority Data

Feb. 8, 2007 (KR) ........................ 10-2007-0013342

(51) Int. Cl.
*H04L 29/06* (2006.01)
(52) U.S. Cl.
USPC ........................................... 713/170; 726/30
(58) Field of Classification Search
USPC ............................................ 713/170; 726/30
See application file for complete search history.

(56) References Cited

U.S. PATENT DOCUMENTS 6,327,652 B1* 12/2001 England et al. .................... 713/2
7,216,363 B2* 5/2007 Serkowski et al. .............. 726/20
2003/0123665 A1* 7/2003 Dunstan et al. ................. 380/255
2004/0146015 A1* 7/2004 Cross et al. ..................... 370/328
2005/0012661 A1* 1/2005 Halivaara ................... 342/357.06
2005/0028192 A1* 2/2005 Hooper et al. ..................... 725/31
2005/0181761 A1* 8/2005 Park ................................. 455/410
2005/0204209 A1* 9/2005 Vataja ............................. 714/701
2005/0210241 A1* 9/2005 Lee et al. ......................... 713/158
2005/0268115 A1* 12/2005 Barde et al. ..................... 713/189
2006/0002236 A1* 1/2006 Punkka ............................. 368/21
2006/0242259 A1* 10/2006 Vallabh et al. ................. 709/217
2006/0253620 A1* 11/2006 Kang ............................... 710/36
2007/0124819 A1* 5/2007 Strohwig et al. ................ 726/26
2007/0294774 A1* 12/2007 Jeong ................................ 726/27
2008/0168565 A1* 7/2008 Reinikainen et al. ........... 726/26

FOREIGN PATENT DOCUMENTS

| JP | 2005-070903 | 3/2005 |
|---|---|---|
| JP | 2005-083079 | 3/2005 |
| JP | 2006-127349 | 5/2006 |
| KR | 1020030044892 | 6/2003 |
| KR | 10-2006-0017774 | 2/2006 |

* cited by examiner

*Primary Examiner* — Joseph P. Hirl
*Assistant Examiner* — John B King
(74) *Attorney, Agent, or Firm* — NSIP Law

(57) ABSTRACT

A method and system for updating time information of a digital rights management (DRM) includes a time server transmitting a time information message to a consumer electronics (CE) device, the CE device transmitting the time information message to a digital rights management DRM device when the CE device receives the time information message from the time server, and the DRM device updating a present time of the DRM device based on the time information message when the DRM device successfully performs authentication with respect to the time information message which has been transmitted from the CE device.

26 Claims, 4 Drawing Sheets

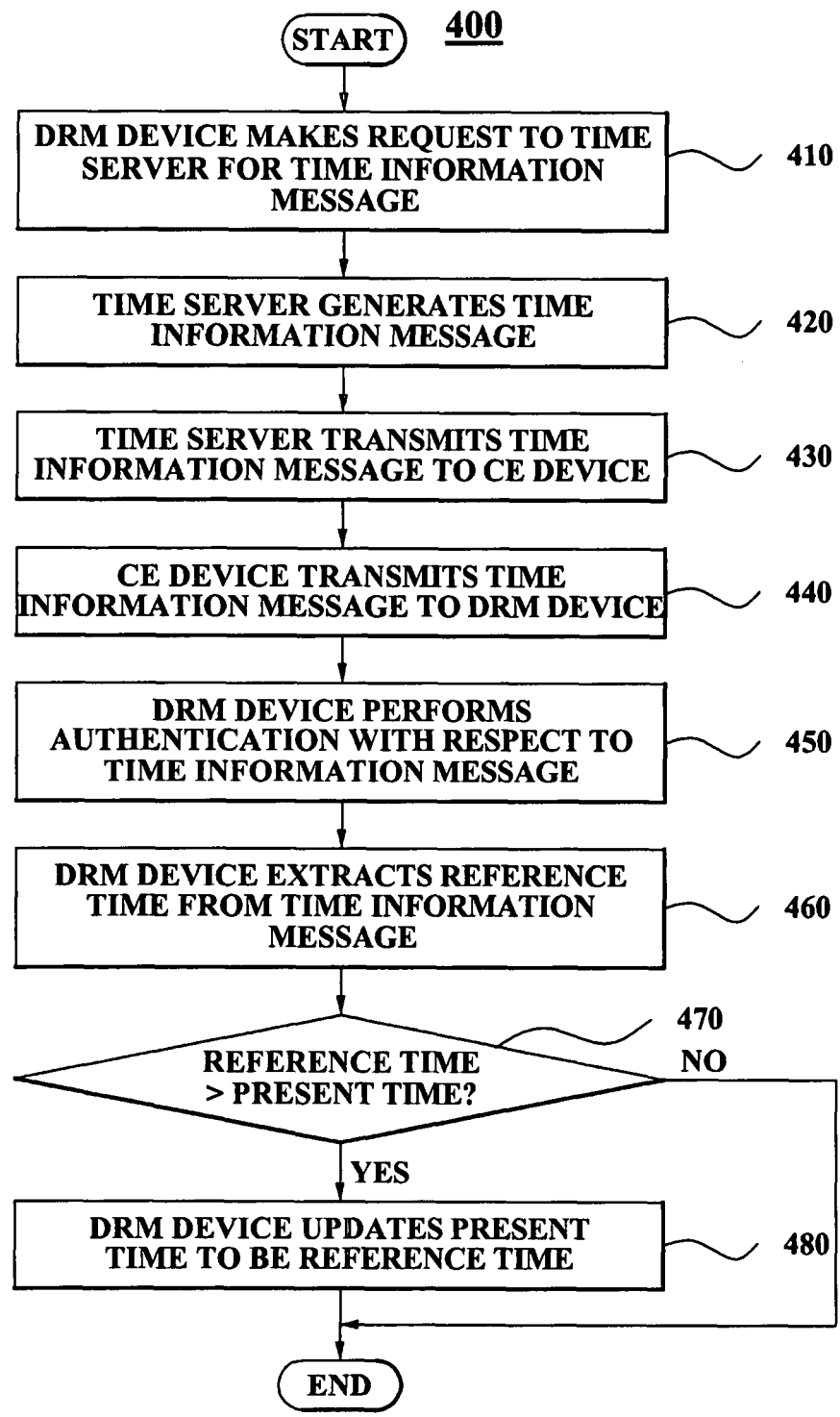

METHOD AND SYSTEM FOR UPDATING TIME INFORMATION OF A DRM DEVICE

CROSS-REFERENCE TO RELATED APPLICATION

This application claims the benefit under 35 U.S.C. §119 (a) of a Korean Patent Application No. 10-2007-0013342, filed on Feb. 8, 2007 in the Korean Intellectual Property Office, the entire disclosure of which is hereby incorporated by reference.

TECHNICAL FIELD

The following description relates to digital rights management (DRM). More particularly, the description relates to a system and method for updating time information of a DRM device and preventing unauthorized use of content.

BACKGROUND

Online content is protected by copyright laws, however, in actuality these laws fail to adequately prevent illegal use and copying of online content. In addition, the widespread use of file exchange programs has resulted in a rapid increase in the amount of illegal copying.

DRM has been developed to protect the intellectual property rights of a content service provider and to prevent illegal copying. DRM supports generation, distribution, and management of content, such as charging and payment services for use of the content.

DRM allows a user to pay a fee to access particular content during a specified time period. Without payment of the appropriate fees, access is prevented by utilizing a security authentication system for the individual content.

In some cases, unauthorized access to content is achieved by circumvention of the DRM system. As an example, the manipulation of time information, which is maintained using a battery or a clock unit, may allow the unauthorized access to content. Accordingly, there is a need for new methods and systems with improved DRM functions to prevent illegal use of content.

SUMMARY

The method and system for updating time information of a DRM device can be used to prevent illegal use of content since a reference time is provided from a time server and a present time of a device is more securely updated based on the provided reference time.

In one general aspect, a method of updating time information of a DRM device includes: transmitting time information from a time server to a consumer electronics (CE) device; transmitting the time information from the CE device to a DRM device; authenticating the time information by the DRM device; and updating a present time of the DRM device in response to the authenticated time information.

In another general aspect, a method of controlling updates of time information for a DRM device in a CE device includes: receiving by the CE device time information from a time server; transmitting the received time information to the DRM device; authenticating the time information by the DRM device; and updating a present time of the DRM device in response to the authentication of the time information.

In yet another general aspect, a method of updating time information of a DRM device includes: receiving from a CE device time information generated by a timer server; authenticating the time information; and updating a present time of the DRM device in response to the authentication of the time information.

In still another general aspect, a computer-readable storage medium storing a program to update time information of a DRM device comprises instructions to cause a computer to: receive from a CE device time information generated by a timer server; authenticate the time information; and update a present time of the DRM device with the time information in response to a successful authentication.

In yet another general aspect, a system for updating time information of a DRM device includes: a time server to generate and transmit time information; a CE device to receive the time information from the timer server and transmit the received time information; and a DRM device to authenticate the time information transmitted by the CE device and update a present time in response to the authentication of the time information.

In yet another general aspect, a CE device includes: a first interface unit to receive time information from a time server; a DRM device to authenticate the time information; and a second interface unit to transmit the received time information to the DRM device, where the DRM device updates a present time based on the time information in response to a successful authentication of the time information.

In yet another general aspect, a DRM device to update time information includes: a first interface unit to receive from a CE device time information generated by a time server; a DRM module to authenticate the time information; and a control unit to update a present time of the DRM device in response to authenticated time information.

In one general aspect, a CE device to access content accessible for a predetermined time period and in communication with a digital rights management (DRM) device to update time information, includes: a first interface unit to receive time information from a time server; a second interface unit to transmit the received time information to the DRM device; and a control unit to control the operation of the CE device, where unauthorized access to content is prevented using a present time derived from the time information in response to a successful authentication of the time information by the DRM device.

In one general aspect, a method of controlling access to content accessible by a CE device for a predetermined time period, the CE device in communication with a DRM device to update time information, includes: authenticating time information received by the DRM device; comparing a reference time of the authenticated time information to a current time of the DRM device; updating the current time in response to the comparison; and controlling access to the content by the CE device according to the updated current time.

Other features will become apparent to those skilled in the art from the following detailed description, which, taken in conjunction with the attached drawings, discloses exemplary embodiments of the invention.

BRIEF DESCRIPTION OF THE DRAWINGS

FIG. 4 is a flowchart illustrating another exemplary method for updating time information of a DRM device.

Throughout the drawings and the detailed description, the same drawing reference numerals will be understood to refer to the same elements, features, and structures.

DETAILED DESCRIPTION

The following detailed description is provided to assist the reader in gaining a comprehensive understanding of the methods and systems described herein. Accordingly, various changes, modifications, and equivalents of the systems and methods described herein will be suggested to those of ordinary skill in the art. Also, descriptions of well-known functions and constructions are omitted to increase clarity and conciseness.

Figure 1:
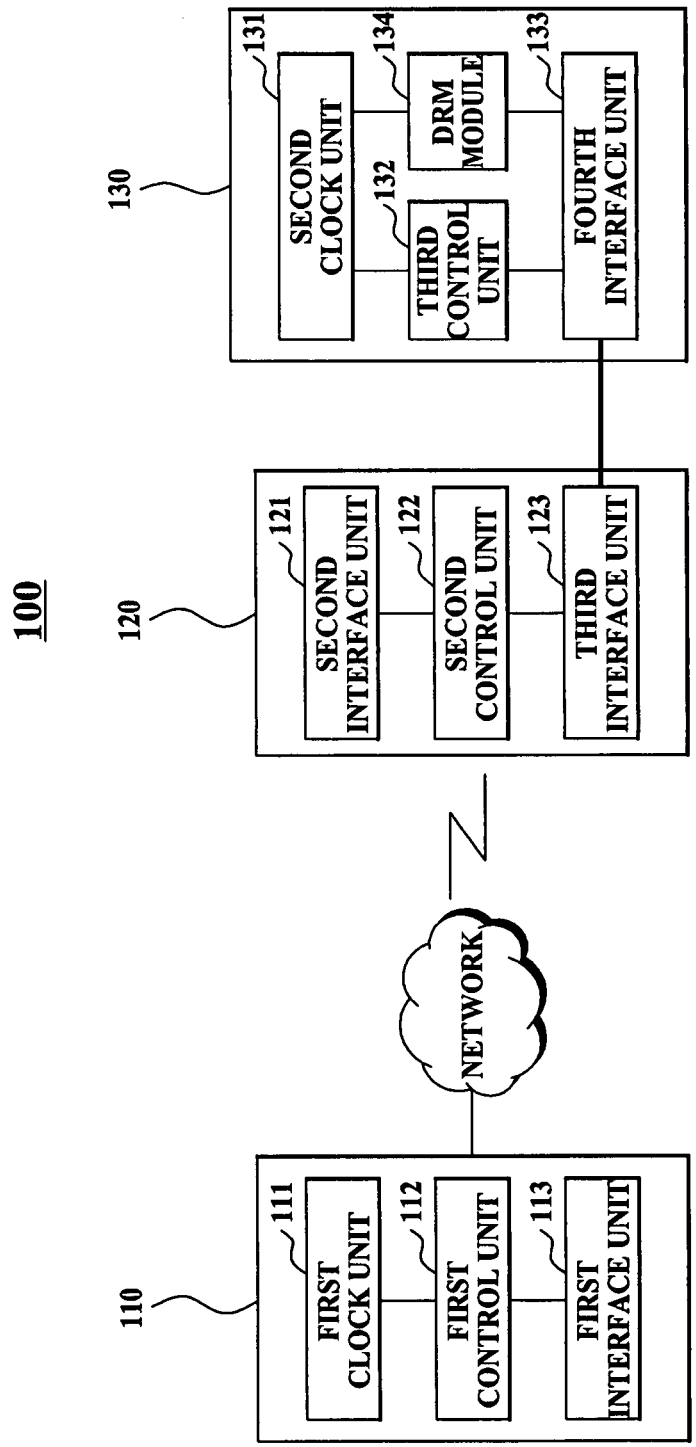
FIG. 1 is a configuration diagram illustrating an exemplary system for updating time information of a digital rights management (DRM) device.

FIG. 1 is a configuration diagram illustrating an exemplary system 100 for updating time information of a digital rights management (DRM) device. As illustrated in FIG. 1, the system 100 includes a time server 110 including: a first clock unit 111, a first control unit 112, and a first interface unit 113; a CE device 120 including: a second interface unit 121, a second control unit 122, and a third interface unit 123; and a DRM device 130 including: a second clock unit 131, a third control unit 132, a fourth interface unit 133, and a DRM module 134.

The time server 110 may periodically generate a time information message, broadcast the generated time information message, and provide the time information. The time server 110 also may transmit the generated time information message to the CE device 120 when the time information is requested by the CE device 120 or the DRM device 130.

The CE device 120 may receive the time information message from the time server 110 and transmit the received time information message to the DRM device 130. In one example, the CE device 120 may be implemented using various electronic devices, such as a set top box (STB), a personal computer (PC), a notebook, personal digital assistants (PDA), a mobile terminal, and the like.

The DRM device 130 may authenticate the time information message received from the CE device 120. The DRM device 130 may update a present time based on the time information message when the time information message is successfully authenticated.

Figure 2:
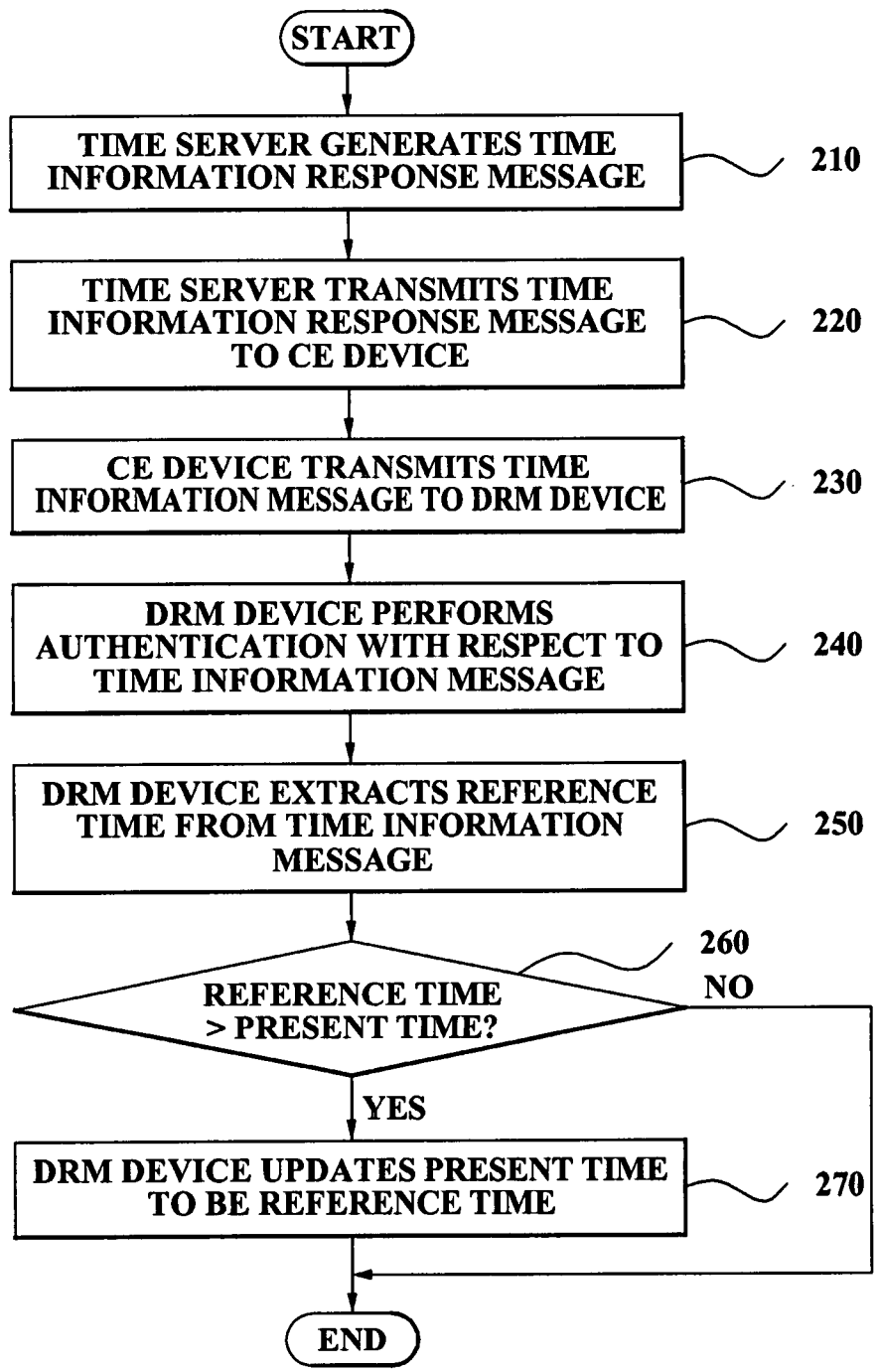
FIG. 2 is a flowchart illustrating an exemplary method for updating time information of a DRM device.

FIG. 2 is a flowchart illustrating an exemplary method 200 for updating time information of a DRM device. As illustrated in FIG. 2, the method 200 includes generating a time information message by a time server (210), transmitting the time information message from the time server to a CE device (220), transmitting the time information message from the CE device to a DRM device (230), authenticating the time information message by the DRM device (240), extracting a reference time by the DRM device (250), comparing the reference time with a present time by the DRM device (260), and updating the present time to be the reference time by the DRM device (270). Hereinafter, the method 200 for updating time information of the DRM device is described in more detail.

Initially, when a user wants to access predetermined stored content, such as a Moving Picture Experts Group Audio Layer 3 (MP3) file, the DRM device 130 may perform a DRM function for the content selected by the user because the content may be used only for a predetermined time period set by a content provider.

The DRM device 130 keeps track of an accurate reference time to perform the DRM function. The time server 110 periodically broadcasts time information to the DRM device 130.

The first control unit 112 of the time server 110 may periodically generate a time information message (210). The first control unit 112 may periodically receive a present time from the first clock unit 111. The first control unit 112 generates the time information message that includes the present time. In one implementation, the time information message may include a time information field and a signature data field. The time information field stores a reference time that is used in the time server 110. The signature data field stores signature data. The signature data may encode the time information field using a private key, such as, for example, the private key of the time server 110. In this example, the reference time may be updated based on time information from any one of a clock unit, a base station, and a Global Positioning System (GPS) satellite.

The first interface unit 113 may transmit the generated time information message to the CE device 120 (220). The second time interface unit 121 of the CE device 120 may receive the time information message transmitted from the time server 110. The second control unit 122 receives the time information message from the second interface unit 121 and outputs the received time information message to the third interface unit 123. The third interface unit 123 may transmit the received time information message to the DRM device 130 (230).

The fourth interface unit 133 of the DRM device 130 may receive the time information message from the CE device 120, and the DRM module 134 may authenticate the received time information message (240). Specifically, the DRM module 134 may extract the signature data included in the time information message, decode the extracted signature data using a public key of the time server 110, and authenticate the time information message.

Because an error in the time server 110 may occur, the time server 110 may add a version information field storing version information when generating the time information message. In this example, the signature data may include the time information field and the version information field both of which are encoded using the private key of the time server 110. The method used by the DRM device module 134 to authenticate the time information message that includes the version information field is described below with reference to FIG. 3.

Figure 3:
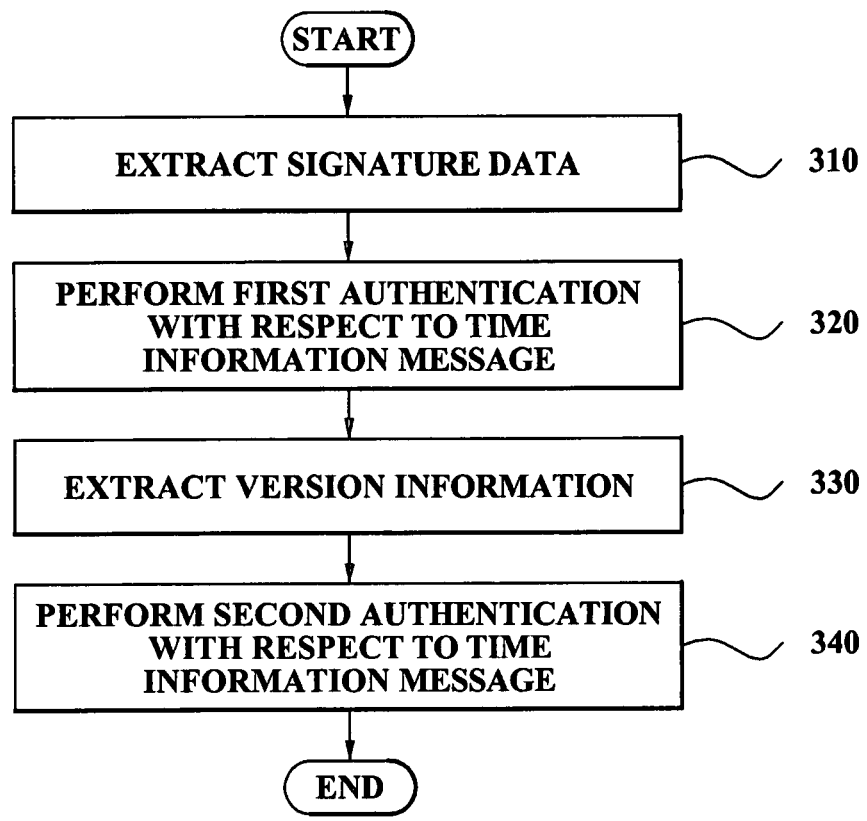
FIG. 3 is a flowchart illustrating an exemplary method for performing authentication of a time information message for the method of FIG. 2.

FIG. 3 is a flowchart illustrating an exemplary method 300 for performing authentication of the time information message described above in reference to FIG. 2. As illustrated in FIG. 3, the method 300 includes extracting signature data (310), performing a first authentication with respect to a time information message (320), extracting version information (330), and performing a second authentication with respect to the time information message (340).

The DRM module 134 may extract the signature data included in the time information message (310). The DRM module 134 may decode the extracted signature data using a public key of the time server 110, and, depending on the result of the decoding, perform the first authentication of the time information message (320).

The DRM module 134 may extract the version information from the time information message (330). The DRM module 134 may compare the extracted version information to the predetermined previous version information, and, depending on the result of the comparison, perform a second authentication of the time information message (340). Specifically, the DRM module 134 may determine that the time information message has been illegally generated when the extracted version information is less than the predetermined previous version information. The DRM module 134 also may determine that the time information message has been legally generated when the extracted version information is equal to or greater than the predetermined previous version information.

In one implementation, the extracted version information may be stored and substituted for the predetermined previous version information when the extracted version information is greater than the predetermined previous version information. Similarly, a time information message determined to have version information that is less than the predetermined previous version information may be regarded as illegally generated, and no substitution of the version is made since the time server 110 updates version information whenever correcting an error occurring in the time server 110.

Referring again to FIG. 2, when the time information message is successfully authenticated, the third control unit 132 may extract the reference time (250), and compare the extracted reference time with a present time (260).

When the extracted reference time precedes the present time, the second clock unit 131 may update the present time to be equal to the extracted reference time (270), When the extracted reference time is subsequent to the present time, the second clock unit 131 does not update and continues to use the present time.

Consequently, whether the content selected by a user may be used is more accurately determined since the DRM module 134 of the DRM device 130 performs the DRM function using the present time of the second clock unit 131.

In one implementation, the DRM device 130 and the CE device 120 may be implemented as separate elements. For example, the DRM device 130 may be detachably connected to the CE device 120 via a wired/wireless interface, such as a Universal Serial Bus (USB) port, a Bluetooth interface, and the like. The DRM device 130 also may be connected to and used by other electronic devices.

In an example, the DRM device 130 may be implemented as a smart card, such as a Subscriber Identity Module (SIM) card, a Removable User Identity Module (R-UIM) card, a Universal Subscriber Identity Module (USIM) card, and the like. The time server 110 also may provide the DRM device 130 with time information when the time information is requested from the CE device 120 or the DRM device 130.

FIG. 4 is a flowchart illustrating an exemplary method 400 for updating time information of a DRM device. As illustrated in FIG. 4, the method 400 may include making a request for a time information message from a DRM device to a time server (410), generating the time information message by the time server (420), transmitting the time information message from the time server to a CE device (430), transmitting the time information message from the CE device to the DRM device (440), authenticating the time information message by the DRM device (450), extracting a reference time by the DRM device (460), comparing the reference time with a present time by the DRM device (470), and updating the present time with the reference time by the DRM device (480). Hereinafter, the method 400 for updating time information of the DRM device is described in further detail.

The DRM device 130 may make a request to the time server 110 for time information associated with content selected by a user via the CE device 120. In various implementations, the DRM device 130 or the CE device 120 may make a request for the time information.

The first control unit 112 of the time server 110 may generate a time information message (420). Specifically, the first clock unit 111 may provide a present time. The first control unit 112 may generate the time information message which includes the present time provided from the first clock unit 111.

The first interface unit 113 may transmit the generated time information message to the CE device 120 (430).

The second interface unit 121 of the CE device 120 may receive the time information message from the time server 110. The second control unit 122 receives the time information message from the second interface unit 121, and once received, the second control unit 122 may output the received time information message to the third interface unit 123. The third interface unit 123 may transmit the received time information message to the DRM device 130 (440).

The fourth interface unit 133 of the DRM device 130 may receive the time information message from the CE device 120, and the DRM module 134 may authenticate the received time information message (450).

When the received time information message is successfully authenticated, the third control unit 132 may extract the reference time from the received time information message (460), and the extracted reference time may be compared with the present time (470).

The second clock unit 131 may update the present time to be equal to the extracted reference time when the extracted reference time precedes the present time (480). When the extracted reference time follows the present time, the clock unit 131 does not update and continues to use the present time.

Consequently, whether the content selected by the user may be used is more accurately determined since the DRM module 134 of the DRM device 130 performs the DRM function using the present time of the second clock unit 131.

The method for updating time information of a DRM device described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. The media may also be a transmission medium such as optical or metallic lines, wave guides, and the like including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations and methods described above.

According to certain embodiments described above, the illegal use of content may be prevented using DRM since a reference time used by the DRM function is provided from a time server, and a present time is securely updated based on the provided reference time.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of controlling updates of time information for a digital rights management (DRM) device in a consumer electronics (CE) device, the method comprising:
receiving by the CE device a time information message comprising time information and version information which are each generated by a time server;
transmitting the received time information and version information to the DRM device;
authenticating the time information by the DRM device;
authenticating the version information by the DRM device;
extracting a reference time from the authenticated time information; and
updating a present time of the DRM device with the extracted reference time, in response to the authentication of the time information and the version information.

2. The method of claim 1, wherein the time information message includes a time information field to store the reference time used in the time server and a signature data field to store signature data of the time information field.

3. The method of claim 2, wherein authenticating the time information comprises:
extracting the signature data in the received time information message;
decoding the extracted signature data using a public key of the time server;
authenticating the time information message in response to a successful decoding of the extracted signature; and
updating a present time of the CE device in response to the authentication of the time information by the DRM device.

4. The method of claim 1, further comprising:
extracting the version information by the DRM device, the extracting of the version information being performed prior to the authenticating of the version information,
wherein the DRM device determines that:
the time information message is illegally generated when the extracted version information is less than a predetermined previous version information stored in the DRM device; and
the time information message is legally generated when the extracted version information is equal to or greater than the predetermined previous version information stored in the DRM device.

5. A method of updating time information of a digital rights management (DRM) device, the method comprising:
receiving from a consumer electronics (CE) device a time information message comprising time information and version information each of which are generated by a time server;
authenticating the time information;
authenticating the version information;
extracting a reference time from the authenticated time information; and
updating a present time of the DRM device with the extracted reference time, in response to the authentication of the time information and the version information.

6. The method of claim 5, wherein the time information message includes a time information field to store the reference time being used in the time server and a signature data field to store signature data of the time information field.

7. The method of claim 6, wherein authenticating the time information comprises:
extracting the signature data in the received time information message; and
decoding the extracted signature data using a public key of the time server; and
authenticating the time information message in response to a result of the decoding of the extracted signature.

8. The method of claim 6, wherein updating the present time of the DRM device comprises:
extracting the reference time from the time information message in response to a successful authentication of the time information message;
comparing the extracted reference time with the present time; and
updating the present time to be equal to the extracted reference time when the extracted reference time precedes the present time.

9. The method of claim 8, further comprising:
continuing to use the present time when the extracted reference time follows the present time.

10. The method of claim 5, wherein the time information message includes a version information field to store the version information of the time information message, a time information field to store a reference time used in the time server, and a signature data field to store signature data of the time information field.

11. The method of claim 10, wherein authenticating the time information message comprises:
extracting the signature data from the received time information message when the DRM device receives the time information message;
decoding the extracted signature data using a public key of the time server;
performing a first authentication of the time information message according to the result of the decoding;
extracting the version information included in the received time information message in response to the first authentication; and
comparing the extracted version information with predetermined previous version information; and
performing a second authentication of the time information message based on the comparison.

12. A consumer electronics (CE) device, comprising:
a first interface unit to receive a time information message comprising time information and version information each of which are generated by a time server;
a digital rights management (DRM) device to authenticate the time information and to authenticate the version information;
a second interface unit to transmit the received time information and version information to the DRM device; and
a control unit to extract a reference time from the authenticated time information,
wherein the DRM device updates a present time based on the reference time, in response to a successful authentication of the time information and the version information.

13. The CE device of claim 12, wherein the time information message includes a time information field to store the reference time used by the time server and a signature data field to store signature data of the time information field.

14. The CE device of claim 12, wherein the DRM device further comprises:
a clock unit to update the present time based on the authenticated time information.

15. The CE device of claim 12, wherein the DRM device is detachably coupled to the CE device.

16. A digital rights management (DRM) device to update time information, the DRM device comprising:
- a first interface unit to receive from a consumer electronics (CE) device a time information message comprising time information and version information each of which are generated by a time server;
- a DRM module to authenticate the time information and to authenticate the version information; and
- a control unit to extract a reference time from the authenticated time information, and to update a present time of the DRM device with the reference time, in response to successfully authenticating the time information and the version information.

17. The DRM device of claim 16, wherein the time information message includes a time information field to store the reference time generated by the time server and a signature data field to store signature data of the time information field.

18. The DRM device of claim 17, wherein the DRM module extracts the signature data from the received time information message, decodes the extracted signature data using a public key of the time server, and authenticates the time information message in response to decoding of the extracted signature data.

19. The DRM device of claim 17, wherein the reference time is updated based on time information generated by any one of a clock unit, a base station, and a Global Positioning System (GPS) satellite.

20. The DRM device of claim 17, wherein the control unit extracts the reference time from the time information message and updates the present time to be equal to the extracted reference time when the extracted reference time precedes the present time.

21. The DRM device of claim 20, wherein the control unit continues to use the present time when the extracted reference time is subsequent to the present time.

22. The DRM device of claim 16, wherein the time information message includes a version information field to store the version information of the time information message in the time server, a time information field to store a reference time being used in the time server, and a signature data field to store the signature data of the time information field.

23. The DRM device of claim 22, wherein the DRM module extracts the signature data from the received time information message, decodes the extracted signature data using a public key of the time server, performs a first authentication of the time information message in response to the decoding of the extracted signature, extracts the version information from the received time information message in response to a successful first authentication, compares the extracted version information with predetermined previous version information, and performs a second authentication of the time information message based on the comparison.

24. A consumer electronics (CE) device to access content accessible for a predetermined time period and in communication with a digital rights management (DRM) device to update time information, the CE device comprising:
- a first interface unit to receive a time information message comprising time information and version information each of which are generated by a time server;
- a second interface unit to transmit the received time information and the version information to the DRM device; and
- a control unit to control the operation of the CE device,
- wherein the DRM device authenticates the time information and also authenticates the version information, the control unit extracts a reference time from the authenticated time information, and unauthorized access to content is prevented using a present time derived from the reference time, in response to a successful authentication of the time information and the version information by the DRM device.

25. The CE device of claim 24, wherein the present time is a present time of the DRM device, and the DRM device updates the present time of the DRM device based on the reference time, in response to a successful authentication of the time information by the DRM device.

26. The CE device of claim 24, wherein the present time is a present time of the CE device, and the present time of the CE device is updated in response to the authentication of the time information by the DRM device.

* * * * *